United States Patent
Rowland

[15] 3,684,348
[45] Aug. 15, 1972

[54] RETROREFLECTIVE MATERIAL

[72] Inventor: William P. Rowland, Southington, Conn.

[73] Assignee: Rowland Development Corporation, Kensington, Conn.

[22] Filed: Sept. 29, 1970

[21] Appl. No.: 76,551

[52] U.S. Cl...................................350/103, 350/288
[51] Int. Cl..............................................G02b 5/12
[58] Field of Search................................350/97–109

[56] References Cited

UNITED STATES PATENTS

| | | | |
|---|---|---|---|
| 2,380,447 | 7/1945 | Jungersen | 350/109 |
| 2,055,298 | 9/1936 | Leray | 350/103 |
| 2,354,049 | 7/1944 | Palmquist | 350/105 |
| 2,481,757 | 9/1949 | Jungersen | 350/103 |

Primary Examiner—David Schonberg
Assistant Examiner—Michael J. Tokar
Attorney—Peter L. Costas

[57] ABSTRACT

Retroreflective material is provided by a composite synthetic plastic structure having a body portion with one smooth surface and another surface from which project a multiplicity of separately formed, minute cube corner formations having a side edge dimension of less than 0.025 inch. The cube corner formations may have a reflective coating thereon, and an adhesive layer and release paper to permit facile mounting on a support surface. Light rays entering through the smooth surface pass into the cube corner formations and are reflected back substantially parallel to the path of entry.

In the method of making the composite material, a fluid molding material is deposited on a molding surface having cube corner recesses and a preformed body member is applied thereto. The molding material is then hardened and bonded to the body member.

16 Claims, 3 Drawing Figures

3,684,348

Inventor
William P. Rowland
By Peter L. Costas
Attorney

RETROREFLECTIVE MATERIAL

BACKGROUND OF THE INVENTION

Various reflective materials are commonly employed for safety and decorative purposes. One of the most common principles employed is simply to apply a reflective coating upon a surface of the item or to construct the item of a highly reflective material such as polished metal. In addition to reflective coatings and specular surfaces, it is also common to use structures which have upon one or both surfaces various formations which reflect the light rays impinging thereon, either principally as a result of the steepness of the angle at which the light ray impinges the reon or by virtue of reflective coatings on the surface of the formations.

There has been a constant demand for retroreflective materials, i.e. materials capable of reflecting the bulk of the light rays impinging thereon in a substantially parallel path back toward the source of the light. Minnesota Mining and Manufacturing Company has sold a material under the trademark SCOTCHLITE which relies upon minute glass spheres embedded in a matrix of synthetic resin to provide such retroreflection. Another type of retroreflective element has been molded member having cube corner formations on one surface thereof, such molded members being formed from glass or synthetic plastic. Indicative of the efforts to use cube corner formations for retroreflective structures are Straubel U.S. Pat. No. 835,648 granted Nov. 13, 1906; Hedgewick et al U.S. Pat. No. 3,258,840 granted July 5, 1966; and Jungersen U.S. Pat. No. 2,310,790 granted Feb. 9, 1943 and No. 2,444,533 granted July 6, 1948.

Cube corner reflectors molded from glass and more recently from acrylic resins have commonly been employed as safety devices on bicycles, automobiles and other vehicles. Although it has been suggested that the cube corner might be of small dimension, generally such formations have been of appreciable size and the nature of the material from which the reflector has been fabricated has resulted in structures which are relatively rigid in character and which do not lend themselves either to shaping to various substrates of nonplanar character or to use as a fabric which might be worn. Moreover, as the size of the cube corner formations is reduced, criticality in control of angles and dimensions becomes far more acute since even a minute deviation will produce a substantial deviation in the capability of the material to retroreflect light rays impinging thereon.

Accordingly, it is an object of the present invention to produce novel retroreflective material having minute closely spaced cube corner formations which return the great preponderance of light rays entering the front surface thereof.

It is also an object to provide such retroreflective material which is relatively flexible so as to permit shaping to conform to support surfaces of various configurations and to permit utilization as a fabric for application to, or formation into, wearing apparel.

Another object is to provide such retroreflective material having an adhesive coating by which it may be conveniently adhered to a support surface.

Still another object is to provide a novel method for manufacturing such retroreflective material from synthetic resins in a manner which permits selection of resins affording optimum characteristics.

A further object is to provide such a method which is relatively simple and economical and which lends itself to a high degree of control in insuring optimum development of the cube corner formations.

SUMMARY OF THE INVENTION

It has now been found that the foregoing and related objects may be readily attained in a retroreflective composite synthetic plastic material comprised of a body portion having substantially smooth surfaces on opposite sides thereof and a multiplicity of minute cube corner formations closely spaced about and projecting from one of the smooth surfaces. The cube corner formations each have three faces and a base adjacent the body portion with a side edge dimension of not more than 0.025 inch and the close spacing avoids any substantial smooth areas therebetween. The body portion and the cube corner formations ate separately formed from essentially transparent synthetic plastic resin and are bonded together into a composite structure wherein those light rays entering into said material through the opposite surface of the body portion predominately pass through the body portion and into the cube corner formations by which they are reflected back through said composite structure substantially parallel to the path of entry.

In the most conveniently formed structure, each cube corner formation has one face parallel to one face of every other cube corner formation. Preferably, the cube corner formations are substantially equal in size and arranged in a pattern of rows and columns. The center-to-center, spacing between cube corner formations are in every row and between cube corner formations in every column is in accordance with a uniform pattern to insure close spacing of the formations and good retroreflection. The apex of each cube corner formation is in alignment with the apices of all of the cube corner formations located in the pattern row and column in which it is disposed, and each apex is vertically aligned with the center of its base.

To provide optimum reflectivity, the composite material has a reflective coating deposited on the cube corner formations, thus permitting it to be placed in intimate contact with support surfaces since the air interface is no longer required for reflecting the light rays. An adhesive layer may then be provided on the reflective coating and a removable piece of sheet material loosely adhered to the adhesive layer. This self-adherent composite structure may be readily used since the sheet material may be removed to adhere the retroreflective sheet material to a substrate. In the optimum form either with or without an adhesive coating, the reflective coating is metallic and the structure includes a layer of resin deposited on the metallic coating to provide protection therefor.

To facilitate mounting on and shaping to surfaces of various configurations, the body portion is flexible; conveniently, the body portion comprises flexible sheet material to which the cube corner formations are adhered. Most desirably, the cube corner formations are less than 0.010 inch along the side edge.

The method for making the retroreflective composite synthetic plastic material includes several steps. A hardenable molding material is deposited upon a mold surface having an array of minute, contiguous cube corner recesses therein, each of the recesses having a maximum side edge dimension of less than about 0.025 inch. The molding material is essentially transparent and is sufficient in amount and fluidity to fill the recesses essentially completely under the conditions of operation. A preformed body member of essentially transparent synthetic resin and having substantially smooth and parallel surfaces is applied to the molding material on the mold surface under sufficient pressure to effect intimate surface contact therebetween.

The molding material is subjected to conditions sufficient to effect substantial solidification thereof and bonding to the adjacent surface of the body member to form a composite material. Then, the composite material is removed from the mold surface to provide a retroreflective material comprising a body portion having a substantially smooth front surface provided by the preformed body member and a multiplicity of minute cube corner formations corresponding to the recesses and closely spaced about and projecting from the opposite surface of the body portion. The close spacing substantially avoids any flat areas between the cube corner formations so that the light rays entering the composite material through the front surface of the body member predominately pass through and into the cube corner formations by which they are then reflected back through the composite material along a path substantially parallel to the path of entry.

As will be appreciated from the preceding description of the preferred structure, the method of manufacture may include an additional step in which a reflective coating is deposited on the faces of the cube corner formations. An adhesive layer may then be deposited on the reflective coating, and a removable piece of sheet material may be loosely adhered to the adhesive layer. Thus, the removable sheet material may thereafter be removed to adhere the retroreflective material to a substrate. Most desirably, the reflective coating is a metallic deposit and a layer of resin is deposited on the metallic coating to provide protection therefor. The body member most desirably is flexible for mounting of the composite material on surfaces of various configuration.

The molding material may be a molten resin and the solidification thereof accomplished at least in part by cooling, the inherent nature of the molten resin producing bonding to the body member thereof. Alternatively, the molding material may be a fluid resin having crosslinkable groups and the solidification thereof may be accomplished at least in part by cross-linking of the resin. In still another embodiment, the molding material may be a fluid partially polymerized resin formation and wherein the solidification thereof is accomplished at least in part by polymerization of the resin formulation.

Preferably, the mold surface is metallic to provide optimum devolopment of the cube corner formations. Most desirably, the preformed body member is applied with sufficient pressure to distribute substantially uniformly the molding material over the mold surface to achieve a substantially uniform thickness for the composite material. In this manner, a substantially uniform thickness for is achieved for the body portion of the composite structure.

DETAILED DESCRIPTION OF THE DRAWINGS

DETAILED DESCRIPTION OF THE ILLUSTRATED EMBODIMENTS

Figure 1:
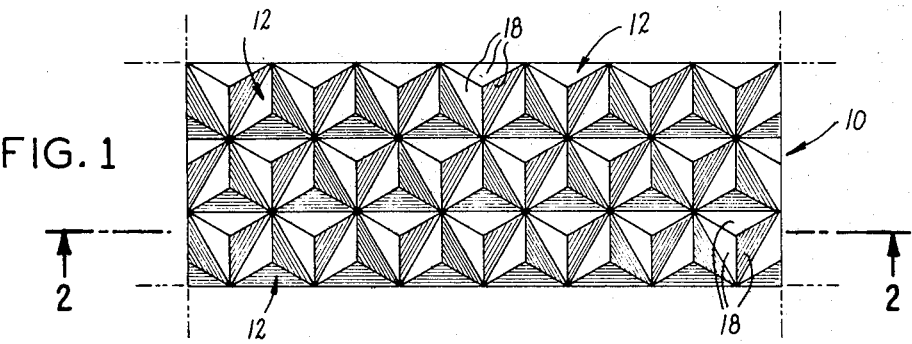
FIG. 1 is a fragmentary rear view of composite retroreflective material embodying the present invention.
Figure 2:
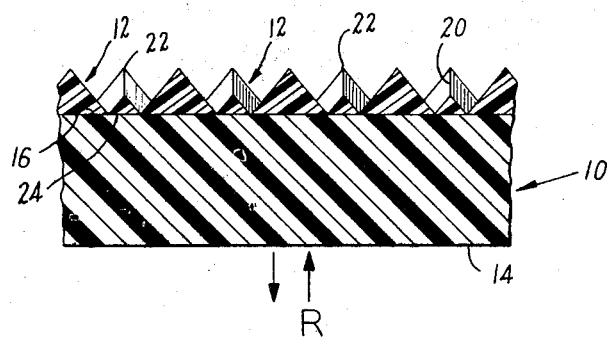
FIG. 2 is a fragmentary sectional view of the retroreflective material along the line 2—2 of FIG. 1.

Turning first to FIGS. 1 and 2 of the attached drawing, therein illustrated is composite retroreflective material embodying the present invention and comprised of a body portion generally designated by the numeral 10 and a multiplicity of cube corner formations generally designated by the numeral 12. The body portion 10 has two parallel smooth surfaces 14 and 16, the surface 16 having bonded thereto the cube corner formations 12.

As best seen in FIG. 1, the cube corner formations 12 each have three planar faces 18 which are disposed in planes perpendicular to each other and intersecting along side edges 20. The apex 22 of each formation is vertically aligned with the center of the base 24 thereof as is best seen in FIG. 2. The cube corner formations 12 are arranged in a pattern providing rows and columns, and the center-to-center spacing between the apices 22 of the cube corner formations 12 along the rows and columns is in accordance with a regular pattern to insure close spacing and avoid substantially any flat areas therebetween.

Since the cube corner formations 12 are so configured, a light ray R entering the front surface 14 of the composite material passes through the body portion 10 and into a cube corner formation 12. When it strikes one of the planar faces 18, it is directed to another of the planar faces 18, it is directed to another of the planar faces 18 which in turn reflects the ray to the third planar face 18. The ray is then directed out the cube corner formation 12 in a return path so that its path back through the body portion 10 and out through the front surface 14 is substantially parallel to its path of entry. This is the principle of retroreflection; as a result, it is extremely critical that the dimensions and angles of the cube corner formations 12 be closely controlled.

Figure 3:
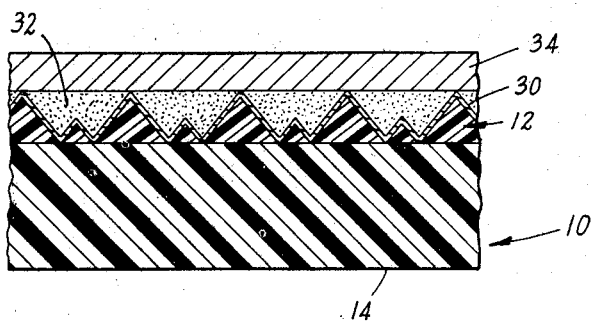
FIG. 3 is a view similar to that in FIG. 2 illustrating an embodiment having an adhesive coating and release paper thereon.

Turning now to FIG. 3, therein illustrated is an embodiment of the invention wherein the basic composite material includes further elements to permit its affixation to support surfaces by adhesion. The basic composite material of FIGS. 1 and 2 is employed herein and the reference numerals are the same. A reflective coating 30 is applied to the surface of the cube corner formations 12 conveniently by metallizing or by applying a suitable lacquer thereto. Deposited over the back surface of the composite material is a coating 32 of an ever tacky adhesive and a release paper 34 is then loosely adhered thereon. To mount this structure on a suitable surface, the release paper 34 is removed and the composite material pressed thereagainst so that the adhesive coating 34 will adhere thereto. Since the faces 18 of the cube corner formations 12 have the reflective coating 30 thereon, light rays are still reflected therefrom.

As has been previously indicated, a key aspect of the present invention resides in the utilization of minute cube corner formations which are closely spaced so as to avoid substantially any smooth or flat areas therebetween. Although the cube corner formations may have a side edge dimension of up to 0.025 inch, the preferred structures utilize a side edge dimension of not more than 0.010 inch and most desirably on the order of 0.004–0.008 inch.

The thickness of the body portion of the composite structure may vary considerably depending upon the application. Generally, it is preferred to use sheet material having a thickness of 0.002–0.030 inch and most desirably about 0.003–0.010 inch. However, for some applications thicker structures may be desirable and so a preformed body member of substantially greater thickness may be employed and it may be made by injection molding, casting, or other techniques.

By constructing the composite material from a separate body portion and to which are adhered the separately formed cube corner formations, it is possible to achieve the maximum control over the cube corner formations and also to select different resins for the two components. Although it is theoretically possible to emboss the cube corner formations into the surface of preformed synthetic plastic material, efforts to utilize such a technique in the production of minute cube corner formations of the type used in the present invention have proven unsatisfactory. Any aberration in flow of the material into the recesses of the embossing member will greatly affect the retroreflectivity of the resultant product. Moreover, variations in thickness of the preformed material which is embossed tend to affect the precision with which the cube corner formations may be developed. Efforts to mold the cube corner formations and the body portion of the product simultaneously have also proven generally unsatisfactory because of the difficulty in obtaining adequate control of the thickness of the web and optimum characteristics in this product. Moreover, such a procedure requires that the same resin be employed for the two portions of the structure.

Thus, the process of the present invention has proven particularly advantageous in affording optimum control over the development of the cube corner formations and in permitting a selection of distinct resins for the body portion and for the cube corner formations. In this process, a mold surface is produced having precisely formed cube corner recesses which are so closely spaced as to avoid substantially any smooth areas therebetween. Although the mold may be formed from a synthetic resin, the preferred mold has a metallic surface to ensure very smooth, precise surfaces on the cube corner faces and to minimize the likelihood of deterioration during extensive use, as well as of possible adhesion between the molding material and the surface of the mold. Accordingly, the mold may be fabricated directly from a suitable metal by engraving, hobbing or otherwise forming the cube corner recesses therein. Alternatively, a suitably engraved or otherwise formed metallic member may be used as a master mold for forming the desired mold element by the deposition of metal thereon to form a layer of sufficient thickness which is then stripped therefrom. Exemplary of a suitable technique is the conventional electroforming procedure. These stripped impressions are then used as the mold elements, most desirably after mounting upon a suitable support surface to avoid injury thereto. In order to minimize corrosion of the metallic surface of the mold it has been found desirable to provide a highly inert metallic coating thereon such as may be obtained by depositing gold or a gold alloy thereon.

Various synthetic resins may be employed for the cube corner formations and for the body portion, including polymers of (alk) acrylic acid esters such as polymethyl methacrylate and polybutyl acrylate; cellulose esters such as cellulose acetate, cellulose acetate/butyrate copolymers and cellulose proprionate; vinyl halides such as polyvinyl chloride and polyvinyl fluoride; vinylidene halides such as polyvinylidene chloride; monovinylidene aromatic hydrocarbon polymers such as polystyrene and styrene/acrylonitrile copolymers; ethylenically unsaturated nitriles such as polyacrylonitrile; polycarbonates; polyesters such as polyethylene terephthalate; polyphenylene oxide; polysulfones; and polyolefins such as polyethylene and polypropylene. Interpolymers of various of the several above mentioned types of monomers, e.g., vinyl chloride/vinyl acetate copolymers, may also be employed as may be mixtures of polymers. The particular resin formulations selected for the components of the composite structure will vary depending upon the application, the thickness desired for the body member, the desire for flexibility, and need for achieving interadhesion therebetween. For outdoor applications, materials which are moisture resistant, ultraviolet resistant and abrasion resistant are particularly advantageous employed at least for the body portion since that portion is generally exposed to the atmosphere and requires good weathering characteristics. Moreover, it will be appreciated that the body portion itself may be a composite of two different synthetic resins.

The resins preferably employed for the body portion include polyvinyl halides, polyethylene terephthalate, polyvinylidene chloride, polycarbonates, polysulfones and cellulose ester polymers. The resins preferably employed for the cube corner formations comprise (alk) acrylic acid ester resins, acrylic-modified vinyl chloride resins, vinyl chloride/vinyl acetate copolymers, ethylenically unsaturated nitrile resins, monovinylidene aromatic hydrocarbon resins, olefin resins, cellulose ester resins, polysulfone resins, polyphenylene oxide resins and polycarbonates. Exemplary combinations for the body portion cube corner formations include polyvinyl chloride/acrylic modified polyvinyl chloride; polyvinyl fluoride/polyvinyl chloride; polycarbonate/polycarbonate; polyvinyl/chloride polymethyl methacrylate; polysulfonelpolymethyl methacrylate; polysulfone/polyvinyl chloride; and polyethylene terephthalate/polymethyl methacrylate.

In selecting the molding materials employed for the present invention, it should be remembered that long lasting properties will require resins which do not have readily volatilizable plasticizers or other components and which have an acceptable level of light stability. Thus, stabilized formulations are desirably employed when the resin itself is susceptible to light or oxygen degradation. By proper selection of the resin systems, the body portion also may provide a valuable degree of protection for the resin of the cube corner formations which may exhibit relatively poor stability when the cube corner formations are reflectively coated and further coated with a lacquer and/or adhesive, these coatings also may act as protective layers since the body portions in many applications will serve as a barrier layer for ultraviolet radiation, vapor, gases, etc. Moreover, the body portion is desirably fabricated of a resin which affords a high degree of abrasion resistance since aberrations in the front surface of the composite material will greatly reduce its reflectivity.

It should be appreciated that the selection of different resins for the two component portions of the product must recognize the need for compatibility of the two resins. For example, one resin must not contain a substance which is deleterious to the other and which will migrate thereinto across the interface. Moreover, when plasticized materials are employed, it is desirable to use plasticizers which do not readily migrate and/or to select formulations for both component resins in which the plasticizer contents are balanced so as to avoid a degree of migration therebetween which might materially affect the properties of the component portions.

In the method, efforts are made to minimize any discrepancies in thickness and to minimize the thickness of any web portion formed of the resin utilized in the production of the cube corner formations. Conveniently, this is accomplished by the application of pressure at the time that the body member is placed upon the mold surface so that excess resin is distributed evenly at the interface and to some extent expressed or extruded outwardly of the interface. MOreover, the application of pressure facilitates the flow of the fluid molding material into the recesses of the mold surface.

The technique utilized for achieving solidification of the molding material will vary with the particular molding material selected, the process characteristics desired and the ultimate properties sought. As a result, versatility in progress design as well as product properties is readily obtained in the present invention. Moreover, because there is versatility, the process selected may be one enabling minimal equipment cost for limited production.

When a molten synthetic resin is employed as the fluid molding material, solidification may be accomplished merely by cooling thereof; this may be accomplished through chilling of the mold, by directing cool air against the surface of the body member or by allowing the heat energy to radiate therefrom. When the molding material is a B-stage or partially polymerized resin, solidification may be accomplished by the application of heat for a period of time sufficient to achieve the desired degree of polymerization. When the molding material is a cross linkable formulation, solidification may be accomplished by promoting cross linking of the component materials through any convenient means depending upon the nature of cross linkable material. As is well known in the art, cross-linking may be effected by use of free radical initiators, heat, high energy radiation and the like. Moreover, it will be appreciated that the molding material may be essentially monomeric in character and that the solidification thereof may be accomplished by polymerization in situ within the cube corner recesses of the mold surface; such polymerization may be promoted by heat, free radical initators, or high energy radiation. In still another technique, a plastisol formulation may be employed in which the resin particles are fluxed by the plasticizer upon the application of heat and fire into a solid structure. Obviously, combinations of these techniques also may be used to obtain the desired solidification.

It will be readily appreciated that the cube corner formations must have smooth surfaces and that the intersecting faces thereof should provide essentially perfect cube corners. Any aberration from a perfect cube corner or surface irregularity will materially reduce the retroreflectivity of the cube corner formation.

Normally, the air interface at the cube corner formations will be relied upon for retroreflection of the light rays. Obviously, the angle at which the light rays strike the faces of the cube corners will be determinative of whether the ray is retroreflected or passes outwardly through the surface. If the angle of incidence is less than the critical angle for the resin employed, the light ray will not be retroreflected. However, the bulk of the light rays, i.e., the predominate portion thereof, entering into the front surface of the sheet material, will be retroreflected by the cube corner formations.

The reflectivity of the cube corner formations can be enhanced by depositing a reflective coating thereon. This reflective coating is conveniently provided by metallizing techniques such as those wherein a very thin film of aluminum or other metal is deposited on the surface by vaporization thereof at very low subatmospheric pressures. Chemical deposition techniques may also be used to produce a reflective metallic coating. Another technique for achieving reflective coatings is to utilize a lacquer containing metallic particles or other pigments affording a high degree of reflectivity; for example, pearl lacquers may be employed. In still another technique, the reflective coating may be provided by a metallized synthetic plastic film which is brought into intimate contact with the surface of the cube corner formations.

When a metallic coating is provided, it is customary to utilize a very thin deposit thereof because of cost considerations as well as the desire to avoid interference with the flexibility of the preferred products. To protect the thin metallic deposit from possible injury during processing, handling and use, it is customary to deposit a protective resin coating thereover, conveniently by spraying or roller coating a lacquer formulation onto the metallic surface.

As has been previously indicated, the adhesive coating upon the reflectively coated composite material offers the advantage of permitting the retroreflective material to be mounted on various support structures where reflectivity may be desired. Although various types of adhesives may be employed, ever tacky adhesives of the type conveniently used in the manufacture of pressure sensitive tapes have proven particularly advantageous. These adhesives may be applied either in solvent systems or as aqueous emulsions, depending upon the particular resin forming the base thereof.

In order to facilitate handling and shipping, a readily releasable sheet material is applied over the surface of the adhesive, conveniently of the coated paper-type referred to in the industry as "release paper." However, other forms of sheet material including synthetic plastic films may be employed therefor so long as they exhibit a low degree of adhesion to the adhesive coating to facilitate stripping therefrom without removal of the adhesive coating from the composite material.

Exemplary of the present invention is the method described in the following specific example.

EXAMPLE ONE

An engraved master plate was formed from aluminum using a cutting tool which generated a pattern of cube corner formations substantially as illustrated in FIGS. 1 and 2. Electroforms of nickel were then prepared therefrom and assembled into a larger mold surface in which the cube corner recesses were closely spaced and had a depth or vertical height of 0.00235 inch and a side edge dimension of 0.0056 inch.

Onto the surface of the mold assembly is deposited a volume of vinyl chloride/vinyl acetate copolymer plastisol formulation containing monomeric plasticizers and 10.0 percent of a cross linkable acrylic resin. The resin formulation was placed in a line along one end of the mold surface. Onto the surface of the mold and volume of resin forulation was then applied a length of ployvinyl chloride film of about 0.012 inch thickness and pressure was applied to the outer surface thereof by means of a roll to bring about intimate contact with the resin formulation and to distribute that formulation uniformly over the mold surfaces as the film was rolled into contact therewith. The resin formulation filled the recesses completely and excess material was expressed from the end of the film. After proper orientation of the resin formulation and film, the assembly was exposed to radiant heaters to elevate the temperature of the resin formulation to about 350° Fahrenheit for about one minute to flux the formulation and cross link the acrylic resin component. The heating was discontinued and the assembly allowed to cool, after which the composite structure was removed from the mold surface.

Upon removal, examination under a microscope indicated that the surface of the film had minute cube corner formations bonded thereto in close array as illustrated in FIGS. 1 and 2 of the attached drawing. The composite sheeting was highly flexible and could be readily utilized for fabric applications. Upon testing with a controlled light source, it was found that it was highly retroreflective within a narrow cone over angles of incidence to the front surface up to 45°. This material was tested for reflective applications in the form of hang tags, welting, flags and was found to provide a high degree of reflection and attention gathering.

EXAMPLE TWO

The procedure of Example One was substantially repeated, except that a 0.002 film of polyvinyl fluoride and a cross-linkable acrylic molding formulation were employed. Heat was used to effect polymerization and cross linking of the molding formulation. The resultant product was found to be retroreflective and similarly suited for diverse applications.

Although the cube corner formations in the illustrated embodiments have a uniform orientation within the pattern, it is possible to employ a pattern in which some of the cube corner formations have their faces disposed in a manner so that their faces are not parallel to any of the faces of the adjacent cube corner formations. In another embodiment, the apex of some of the cube corner formations is not vertically aligned with the center of its base; by thus tipping some of the cube corner formations, retroreflectivity over a broader angle is provided for certain applications while maximum retroreflectivity is diminished. For example, highway signs desirably may exhibit retroreflection over a broader angle to the surface of the sign, and some light scattering may desirably be provided although the light rays falling thereon may be essentially perpendicular to its face.

By fabricating the preformed body portion of a relatively flexible resin, conveniently in the form of sheet material, the composite structure may be readily shaped to various support surfaces, such as the corners of hand rails, buildings and the like. Moreover, since the composite structure may be very thin and highly flexible, it may be readily applied to fabrics used as garments or it may itself be used in such manner, thus affording a great deal of visibility to the wearer. Exemplary uses for safety applications are tabs and stripes on jackets and rainwear, tags that may be worn at various points upon the body, reflective patches for hats, reflective welting for the production of various garments, etc.

Accordingly, it can be seen from the foregoing detailed specification that the composite material of the present invention is highly retroreflective and employs minute, closely spaced cube corner formations which return the great preponderance of light rays entering front surface thereof. The composite material may be relatively flexible so as to permit shaping to conform to support surfaces of various configurations and also to permit utilization as a fabric for application to, or formation into, wearing apparel. In accordance with one embodiment, a self-adhering structure may be provided through utilization of an adhesive coating. The composite material may be readily manufactured from various synthetic resins to permit selection of resins affording optimum characteristics for the components thereof. The method is relatively simple and economical and lends itself to a great deal of control for ensuring optimum development of the cube corner formations.

Having thus described the invention, I claim:

1. Retroreflective composite synthetic plastic material comprising: a body portion having substantially parallel, smooth surfaces on opposite sides thereof, and a multiplicity of minute cube corner formations closely spaced about and projecting from one of said smooth surfaces, said cube corner formations each having three faces and a base adjacent said body portion with a side edge dimension of not more than 0.025 inch and said close spacing avoiding any substantial smooth areas therebetween, said body portion and said cube corner formations being separately formed from essentially transparent synthetic plastic resin, said cube corner formations being cast against said body portion and being bonded therewith into a composite structure wherein those light rays entering into said material through the other of said surfaces of said body portion predominately pass through said body portion and into said cube corner formations by which they are reflected back through said composite structure substantially parallel to the path of entry.

2. The retroreflective material of claim 1 wherein each cube corner formation has one face parallel to one face of every other cube corner formation.

3. The retroreflective material of claim 1 wherein said cube corner formations are substantially equal in size and arranged in a pattern of rows and columns in which the center-to-center spacing between cube corner formations in every row and between cube corner formations in every column is in accordance with a uniform pattern.

4. The retroreflective material of claim 3 wherein the apex of each cube corner formation is in alignment with the apices of all of the cube-corner formations located in the pattern row and column in which it is disposed.

5. The retroreflective material of claim 1 wherein the apex of each cube corner formation is aligned with the center of its base.

6. The retroreflective material of claim 1 including a reflective coating on said faces of said cube corner formations.

7. The retroreflective material of claim 6 further including an adhesive layer on said reflective coating and a removable piece of sheet material loosely adhered to said adhesive layer whereby said sheet material may be removed to adhere said retroreflective sheet material to a substrate.

8. The retroreflective material of claim 6 wherein said reflective coating is metallic and including a layer of resin deposited on said reflective coating to provide protection therefor.

9. The retroreflective material of claim 1 wherein said body portion is flexible for mounting on surfaces of various configurations.

10. The retroreflective material of claim 9 wherein said body portions comprises flexible sheet material to which said cube corner formations are adhered.

11. The retroreflective material of claim 1 wherein said cube corner formations are less than 0.010 inch along the side edges.

12. Retroreflective composite synthetic plastic sheeting comprising: a body portion of flexible synthetic resin sheet material having substantially parallel, smooth surfaces and a multiplicity of minute cube corner formations separately formed from synthetic resin and adhered to one of the surfaces of said body portion, said formations being closely spaced about and projecting from said surface so as to avoid any substantial smooth areas therebetween, said cube corner formations each having three faces and a base adjacent said body portion with a side edge dimension of not more than about 0.010 inch, the resins of said sheet material and said cube corner formations being essentially transparent, said cube corner formations being cast against said sheet material and bonded therewith into a composite structure, said cube corner formations being substantially equal in size and being arranged in a uniform pattern of rows and columns in which the center-to-center spacing between the cube corner formations in every row and the center-to-center spacing between the formations in every column are in accordance with a uniform pattern, the apex of each of said cube corner formations being vertically aligned with the center of its base to provide faces of equal size, said sheeting providing a structure wherein the light rays entering through the other of said surfaces of said body portion predominately pass through said body portion and into said cube corner formations by which they are reflected back through said body portion substantially parallel to the path of entry.

13. The retroreflective sheeting of claim 12 wherein there is included a reflective coating on the faces of said cube corner formations.

14. The retroreflective sheeting of claim 13 further including an adhesive layer on said reflective coating and a removable piece of sheet material loosely adhered to said adhesive layer whereby said sheet material may be removed to adhere said retroreflective sheet material to a substrate.

15. The retroreflective sheeting of claim 13, wherein said reflective coating is metallic and wherein there is included a layer of resin deposited on said metallic coating to provide protection therefor.

16. The retroreflective sheeting material of claim 12 wherein the resins of said cube corner formations and said sheet material are of essentially similar monomer composition.

* * * * *